United States Patent [19]

Katona et al.

[11] Patent Number: 5,124,372
[45] Date of Patent: Jun. 23, 1992

[54] NON-SAG AGENT AND COMPOSITION AND METHOD RELATING THERETO

[75] Inventors: Annette F. Katona, Richmond Heights; Steve L. Hannah, Chagrin Falls, both of Ohio

[73] Assignee: Tremco Incorporated, Cleveland, Ohio

[21] Appl. No.: 614,959

[22] Filed: Nov. 15, 1990

Related U.S. Application Data

[63] Continuation of Ser. No. 326,710, Mar. 21, 1989, abandoned.

[51] Int. Cl.$^5$ .............................................. C08K 9/00
[52] U.S. Cl. ................................... 523/200; 523/205; 523/212; 523/213; 523/214; 523/215; 523/216; 523/217
[58] Field of Search ............... 523/200, 205, 212, 213, 523/214, 215, 216, 217

[56] References Cited

U.S. PATENT DOCUMENTS 2,927,091 3/1960 Liggett ................................ 106/465
4,242,245 12/1980 Allison, III .................... 260/278 B

FOREIGN PATENT DOCUMENTS 272257 12/1986 Japan .
1030387 7/1983 U.S.S.R. ............... 106/465

*Primary Examiner*—Paul R. Michl
*Assistant Examiner*—John J. Guarriello
*Attorney, Agent, or Firm*—Alfred D. Lobo; David P. Dureska

[57] ABSTRACT

A non-sag agent useful in providing non-sag properties to many conventional curable, polymeric adhesives and sealants, said agent comprising:

a first component comprising crush resistant coated particles wherein the first component particles are less than about 1 and ½ microns in size and have a coating of about 0.1% to about 10% by weight of the particle and wherein said coating substantially comprises a first surface modifying agent, a second component comprising crush resistant coated particles wherein the second component particles are about 1 and ½ to about 3 microns in size and have a coating of about 0.1% to about 10% by weight of the particle and wherein said coating substantially comprises a second surface modifying agent, said second surface modifying agent being the same or different from said first surface modifying agent, a third component comprising substantially inert crush resistant particles wherein the particle size is about 4 to about 100 microns, said agent comprising about 25-65 weight percent first component, about 5-25 weight percent second component and about 25-65 weight percent third component.

6 Claims, No Drawings

NON-SAG AGENT AND COMPOSITION AND METHOD RELATING THERETO

This is a continuation of copending application(s) Ser. No. 07/326,710 filed on Mar. 21, 1989.

BACKGROUND OF THE INVENTION

1. Field of the Invention

The present invention relates to polyurethane joint sealing compounds which are useful for sealing, caulking and glazing operations, particularly in the construction industry. More specifically, the present invention is directed to a reliable, low-cost, one or two part, non-sag curable polymeric sealants which can provide a soft, low modulus seal suitable for joints which are subject to substantial variations in width and movement.

2. Discussion of the Prior Art

Polyurethane adhesives or sealants and similar-type curable polymeric materials, such as polyacrylic adhesives or sealants, in general have relatively high bond strengths, flexibility, shock and impact resistance, fatigue resistance, and the like. The adhesion or bonding of such compounds arises primarily from a polymerization reaction (otherwise known as curing) which is designed to occur once the adhesive or sealant is applied. As the adhesive or sealant cures, it chemically bonds to most contacting surfaces and transforms from a soft, workable liquid or semi-liquid to a firm, resilient, elastomeric solid. The curing process is generally not reversible, and once the polyurethane adhesive or sealant is applied and allowed to cure, the material generally cannot be removed and re-applied.

Not surprisingly therefore, polymeric adhesives or sealants are generally sold in a non-cured form, containing polymerizable components which are designed to cure upon application. In general, such adhesives or sealants are created from a prepolymer component and a curative component. Typically for polyurethanes, the prepolymer component is an organic polyisocyanate having excess isocyanate functional groups in a weight percent amount of about 2% to about 10%, more typically 4% to about 7%. The curative is generally a reactive hydrogen-containing material.

Two-step systems generally require mixing just prior to application, and such mixing is often found to be inconvenient and burdensome. Therefore one step systems are generally preferred by end users. One step systems have only a single component to apply. This component will generally cure due to ambient conditions, most often due to moisture in the air. In polyurethane systems, moisture in the air can react with the isocyanate reactive sites and cause polymerization directly or can react with an intermediary, such as oxazolidine or ketimine, to produce a reaction product (typically an amine) which in turn initiates curing.

Regardless of whether the system is one component or two component, the adhesive or sealant will generally also contain sufficient urethane catalyst to give the desired cure time, so the adhesive can be applied prior to curing. Such one and two part polyurethane adhesives or sealants are widely employed in many industries, such as the construction industry and motor vehicle industry.

For application to vertical areas, such as wall surfaces or window frames, a sealing material is required to be of the non-sag type, i.e. substantially free from sagging or slumping immediately after application. "Non-sag" type sealing material should flow easily by external forces during its mixing and application, but should not flow (and therefore should exhibit a substantial increase in apparent viscosity) when it is at a stand still. Such behavior is generally described as thixotropic.

Thixotropic polyurethane sealants and adhesives are known generally in the art, but are not without their problems. Such materials often require a precise formulation which may be unforgiving if any errors occur during the manufacturing process. Moreover, such materials are sometimes also sensitive to temperature, and unfortunately a large portion of the thixotropic sealant or adhesive market involves large temperature extremes (automobile, building and roadway surfaces can have rather extreme variations in temperature). Some such sealants or adhesives do not work well when the width of the space sealed by the sealant varies by 25% or more.

Many known thixotropic sealants are expensive and difficult to manufacture. Such sealants or adhesives may be thixotropic but may nevertheless be undesirable due to a high yield point. A high yield point occurs when sealant movement is difficult to initiate, such as when removing the sealant from its storage container; once in motion however the material becomes much more flowable.

Urethane base sealing materials known in the art generally comprise a urethane prepolymer, a plasticizer, adhesion improver, catalyst and pigment or the like, together with a filler. The filler contributes not only to increasing the weight and thickness of sealing material, but also to control the hardness of cured the material.

Conventional fillers and reinforcing agents for polyurethanes and plastics are calcium carbonate, carbon black, diatomaceous earth, titanium dioxide, silica, talc, calcium silicate, Wollastonite, Asbestine, Kaolin, barium sulfate, graphite, hydrated alumina, chrysotile, serpentine, peralite, vermiculite, mica, crocidolite, zirconium silicate, barium zirconate, calcium zirconate, magnesium zirconium silicate, glass beads, fiberglass, titanium dioxide, PMF mineral fiber, nylon fiber, polyester fiber, alpha-cellulose fiber, polypropylene fiber, and the like. However, conventional fillers which are satisfactory for a joint sealant generally do not provide the desired combination of low modulus and non-sag properties when used alone or in combination with other fillers. The mixing of different fillers has generally been found to provide no synergistic result.

Adhesives without fillers generally have low sag resistance, and therefore fillers have generally been incorporated to develop or increase sag resistance where such resistance is needed. Unfortunately, this technique also increases the viscosity of the component or components containing the filler, making it more viscous and more difficult to apply.

Hence, loading with high levels of filler increases sag resistance but typically results in difficulties in obtaining satisfactory mixing, because high pressure mixing (or shear) equipment and high pressure pumping equipment are generally needed. Furthermore, high filler loading in many cases tends to lower the strength of the adhesive bond and typically decreases elasticity.

If the filler cannot provide sufficient non-sag properties, a non-sag agent might also be used. Common non-sag agents include colloidal silica, PVC plasticizers, castor oil derivatives, bentinite clays. Although non-sag agents provide non-sag properties superior to most fillers, like fillers, non-sag agents also increase the apparent viscosity of the mixture, resulting in considerable reductions in mixing or other operational efficiencies.

As the amount of non-sag agent is increased, the physical properties of the sealing material generally deteriorates, because hardness and modulus are generally increased and elongation and adhesion strength are generally reduced. For this reason, the use of a great amount of an non-sag agent is generally not desirable. However, there have been known in the art few, if any, non-sag agents which are useful for urethane sealing material in only a small amount. Therefore conventionally known non-sag agents are often used in combination with one or more fillers.

Some sealants employ a non-sag elastomeric type silicone caulking composition which provides a soft low modulus elastomeric product. However such joint sealants are generally expensive, can cause staining, and often cannot be painted.

A two-component epoxy-type polyurethane joint system has been on the market for many years under the trade name DYMERIC and is disclosed generally in U.S. Pat. No. 3,445,436. This two-component sealant has non-sag properties and, when cured, has a low modulus comparable to many other sealants. However, it is a two part system which requires mixing just prior to application.

One-component non-sag, moisture curing polyurethane caulking compositions have been very popular for simple joint sealing operations due to the economy of application, but they present certain problems. It has generally not been possible to provide a low modulus one-component polyurethane sealant having the desired softness, sag resistance and flow characteristics which could be easily manufactured at a relatively low cost and which meets the Federal specifications for Class A, cold-applied elastomeric type joint sealants. Such Federal specifications have been in existence for more than a decade and were initiated by the National Bureau of Standards and set forth in Federal specifications TT-S-00227E and TT-S-00230C.

Many known polyurethane sealants have not been able to meet the Class A requirement, because they have excessive durometer hardness (e.g., a Shore A durometer hardness of about 60 or greater when compounded). Manufacturers of caulking compositions unable to obtain such Class A ratings are often severely limited in the marketing of their products, because contracts involving government construction projects generally require Class A sealants meeting the Federal specification.

Conventional compounding techniques make it possible to vary the elastomeric properties and flow properties of a polyurethane sealing composition but it has generally been very difficult to achieve the desired combination of extrudability, non-sag and low modulus merely by judicious choice of compounding ingredients, conventional non-sag agents and/or fillers.

OBJECTS OF THE INVENTION

It is therefore an object of the present invention to provide a low cost, easy to manufacture, curable polymeric sealing or adhesive material which has superior non-sag properties.

It is another object of the present invention to provide a non-sag, easy to apply, urethane based sealing material which has desirable physical properties after curing.

Still further objects and the entire scope of applicability of the present invention will become apparent from the detailed description given hereinafter; it should be understood however that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

A non-sag agent useful in providing non-sag properties to many conventional curable, polymeric adhesives and sealants, said agent comprising:

a first component comprising coated particles wherein the first component particles are less than about 1 and ½ microns in size and have a coating of about 0.1% to about 10% by weight of the particle and wherein said coating substantially comprises a first surface modifying agent, a second component comprising coated particles wherein the second component particles are about 1 and ½ to about 3 microns in size and have a coating of about 0.1% to about 10% by weight of the particle and wherein said coating substantially comprises a second surface modifying agent, said second surface modifying agent being the same or different from said first surface modifying agent, a third component comprising substantially inert particles wherein the particle size is about 4 to about 100 microns, said agent comprising about 2–65 weight percent first component, about 5–25 weight percent second component and about 25–65 weight percent third component.

DETAILED DESCRIPTION OF THE PREFERRED EMBODIMENT

The present invention comprises an non-sag agent having three components—Components A, B and C. Components A and B differ substantially only in size. Component A has a particle size less than about 1 and ½ microns, and Component B has a particle size of about 1 and ½ to about 3 microns. Both Component A and B comprise a particle support of sufficient hardness to be substantially crush resistant in normal use of the sealant or adhesive prior to curing, and this support can be any geometric configuration, but is preferably substantially cubical or spherical. The most preferred support material is calcium carbonate due to its hardness, low cost and relative abundance.

The particle support of Components A and B have a surface modifying agent coating. The particle a coating is preferably about 0.1% to about 10% (by weight) of the particle. The coating is preferably a carboxylic or polycarboxylic acid having about 5-30 carbons or ester derivatives thereof. Suitable coatings include stearic acid, phthalic acid, adipic acid and/or sebacic acid, or ester derivatives thereof, tricresyl phosphate, dibutoxyethyl phthalate ("DBEP"), diisodecyl phthalate ("DIDP"), dibutyl phthalate ("DBP"), butyl benzyl phthalate ("BBP"), dioctyl phthalate ("DOP"), dioctyl sebacate ("DOS"), dioctyl adipate ("DOA"), diethyl butyl sebacate ("DEBS"), dibutoxyethyl glutarate, didecyl glutarate, diisodecyl glutarate, tricresyl phosphate, tributyl phosphate, still bottom phosphate plasticizers and the like.

The optimal surface modifying agent may be dependant upon the type of sealant and/or the conditions under which the sealant will be used. Such can be determined by ordinary experimentation. Of primary importance is the ability of the surface modifying agent to remain on the particle support and not break or dissolve away.

The most preferred Component A coating comprises ester derivatives of adipic, lauric, myristic and/or capric acids. The most preferred coating of Component B is stearic acid. The most preferred amount of coating is about 2% by weight of the particle.

Unlike Components A and B, Component C has no coating, but rather Component C comprises an uncoated particle having a particle size of about 4 to about 100 microns. Component C can be of any substantially inert material, provided it is of sufficient hardness to maintain the 4-100 micron size. Component C particles can be any configuration but are preferably substantially cubical or spherical. Component C most preferably comprises calcium carbonate particles.

In the preferred embodiment, Component A particles are about 0.08 microns in size, Component B particles are about 2 microns in size and Component C particles are about 5.5 microns in size. The preferred weight ratio of the Components A, B and C is about 25-65: 5-25: 25-65, respectively.

The weight percentages of Components A, B and C in the polyurethane sealant is preferably about 62% (all percentages herein are by weight unless otherwise indicated). As the amount of non-sag agent (Components A, B and C) is increased in the polyurethane sealant, improved non-sag properties are generally observed. Noteworthy non-sag properties are generally readily apparent at about 30% and the improvement increases with an increased percentage of non-sag (Components A, B and C) agent. However, at about 75% non-sag agent, the effectiveness of the sealant may begin to deteriorate due to the abundance of non-sag agent (which themselves do not provide significant adhesive or bonding properties to the sealant). However, prior to reaching this range, no deleterious effect is generally observed for the sealant due to the presence of the non-sag component.

Most polyurethane sealants will be able to obtain Class A performance using the non-sag agent in a weight percentage of about 50%-75%, most preferably 62%. Furthermore, the non-sag agent can be mixed with other conventional non-sag agents or fillers which may be desirable due to cost considerations and the like. The appropriate amount of the non-sag agent of this invention for any particular application can be determined by ordinary experimentation using ordinary skill. The preferred weight ratio of the three components based upon 100 weight parts polyurethane sealant is: 20-40 (Component A): 5-15 (Component B): 20-30 (Component C). Most preferably, this ratio is 25-35 (Component A): 7-11 (Component B): 23-28 (Component C).

The optimal ratio and cumulative amount of the non-sag components will generally vary according to the end use application, and performance requirements of the particular end-product. It would be impossible to explicitly describe every possible sealant composition and end-use, and therefore optimalization may have to be determined by ordinary experimentation after having read the present specification and claims.

EXAMPLE

Component A was composed of calcium carbonate particles of about 0.08 microns in diameter and substantially cubic in shape with a (2 weight percent) coating comprising lauric myristic and capric acids and 2-ethylhexyl adipate. The specific surface area for the Component A particles was about 15 meters squared per gram.

The Component B used was a calcium carbonate particle with a stearic acid coating of about 2 weight percent. The particle size can be defined as: 1. percent fines less than 2 microns—50%, and 2. percent fines less than 1 micron—30%. The specific surface area was about 6 meters squared per gram.

Component C comprised particles of about 5.5 microns wherein the particles are about 99.3% calcium carbonate, about 0.3% magnesium carbonate, and about 0.05% silicates.

Example #1 had the following ingredients:

| | |
|---|---|
| Urethane prepolymer | 22.7% |
| Dioctyl Adipate (DOA) | 6.8% |
| Color paste | 3.5% |
| Component A | 27.8% |
| Component B | 8.8% |
| Component C | 25.3% |
| Process Oil | 2.1% |
| Ketimine | 1.5% |
| Other Additives | 1.4% |

The non-sag formulation was tested and found not to be adversely affected by heat aging. Aging was excellent with only a two or three point loss in Shore A after two weeks at 120° F. Elongation tests were successful at 1400% and the compound never sagged, even when placed in a channel heated to 158F.

Adhesion was well within commercially acceptable levels for all substrates tested: concrete, glass, anodized aluminum and granite. Samples had no surface cracks or crazing after 2200 hours in an artificial weathering device. Processing was easier than many conventional systems, since the formulation can be mixed at room temperature and does not need to be heated.

Example #1 is a one part system but could be made into a two part system if the ketimine were removed and a second component curing agent were used, such as an amine conventionally used in such an application.

The above discussion has been provided to aid in the understanding of the present invention. Details provided above are provided primarily to help the ordinary artisan visualize the preferred embodiment and the innumerable other possible embodiments of this invention, and such details are not intended to create any limitations to this invention. Many improvements and modifications are certainly possible, and it would be impossible to explicitly describe every conceivable aspect of the present invention. Therefore, the failure to describe any such aspect is also not intended to create any limitation to the present invention. The limitations of the present invention are defined exclusively in the following claims and nothing within this specification is intended to provide any further limitation thereto.

What is claimed is:

1. A thixotropic composition comprising:
   a curable prepolymer in an amount up to about 75 parts based upon 100 parts of said composition, and a thixotropic agent comprising a first component, second component and third component together present in an amount in the range from about 30 parts to about 75 parts by weight, said first component comprising crush resistant coated particles less than about 1.5 microns in diameter coated with a first surface modifying agent in an amount from about 0.1% to about 10% of the weight of said first component, said first component being present in an amount from about 20 to 40 parts.

said second component comprising crush resistant coated particles about 1.5 to about 3 microns in diameter coated with a second surface modifying agent in an amount from about 0.1% to about 10% of the weight of said second component, said second component being present in an amount from about 5 to 15 parts, said second surface modifying agent being the same or different from said first surface modifying agent, each said surface modifying agent being selected from the group consisting of a carboxylic and a polycarboxylic acid having from 6 to 30 carbon atoms and esters thereof, said third component comprising substantially inert crush resistant particles in the size range from about 4 to about 100 microns, said third component being present in an amount from about 20 to 30 parts, wherein said thixotropic agent consists essentially of 25-65 parts of said first component, 5-25 parts of said second component, and 25-65 parts of said third component.

2. The composition of claim 1 wherein the first component particles are about 0.08 microns in size, the second component particles about 1 microns in size and the third component particles are about 5.5 microns in size.

3. The composition of claim 2 wherein the third component and the uncoated portions of the first and second component substantially comprise calcium carbonate.

4. The composition of claim 3 wherein the coating of the first component and the second component is about 2% by weight of the particle.

5. The composition of claim 1 wherein the curable polymeric material comprises polyurethane, polyacrylate or prepolymers thereof.

6. A method of manufacturing a non-sag adhesive or sealant, said method comprising:

combining a curable prepolymer in an amount up to about 75 parts based upon 100 parts of said composition, and a thixotropic agent comprising a first component, second component and third component together present in an amount in the range from about 30 parts to about 75 parts by weight, said second component comprising crush resistant coated particles about 1.5 to about 3 microns in diameter coated with a second surface modifying agent in an amount from about 0.1% to about 10% of the weight of said second component, said second component being present in an amount from about 5 to 15 parts, said second surface modifying agent being the same or different from said first surface modifying agent, each said surface modifying agent being selected from the group consisting of a carboxylic and a polycarboxylic acid having from 6 to 30 carbon atoms and esters thereof.

said third component comprising substantially inert crush resistant particles in the size range from about 4 to about 100 microns, said third component being present in an amount from about 20 to 30 parts, wherein said thixotropic agent consists essentially of 25-65 parts of said first component, 5-25 parts of said second component, and 25-65 parts of said third component.

* * * * *